United States Patent [19]
Cohen

[11] 4,146,308
[45] Mar. 27, 1979

[54] FOLDABLE MIRROR CONSTRUCTION
[75] Inventor: Elihu Cohen, New York, N.Y.
[73] Assignee: Trina, Inc., Fall River, Mass.
[21] Appl. No.: 870,926
[22] Filed: Jan. 18, 1978
[51] Int. Cl.² ........................ G02B 5/10; A47G 1/24
[52] U.S. Cl. ............................... 350/306; 248/472
[58] Field of Search ............ 350/306, 299; 248/472, 248/469, 474

[56] References Cited
U.S. PATENT DOCUMENTS

| 807,440 | 12/1905 | Conroy | 248/474 |
|---|---|---|---|
| 1,005,731 | 10/1911 | Miles | 350/306 |

FOREIGN PATENT DOCUMENTS 620265  4/1927  France ........................ 248/472

*Primary Examiner*—Jon W. Henry
*Attorney, Agent, or Firm*—Salter & Michaelson

[57] ABSTRACT

A mirror construction having two separate mirrors and a frame assembly. The frame assembly serves to support the mirrors in an upright use position such that one may optically view oneself simultaneously in the two mirrors. The construction is furthermore foldable to a storage position wherein the frame assembly and the mirrors substantially nest with each other to present a substantially flat configuration.

10 Claims, 7 Drawing Figures

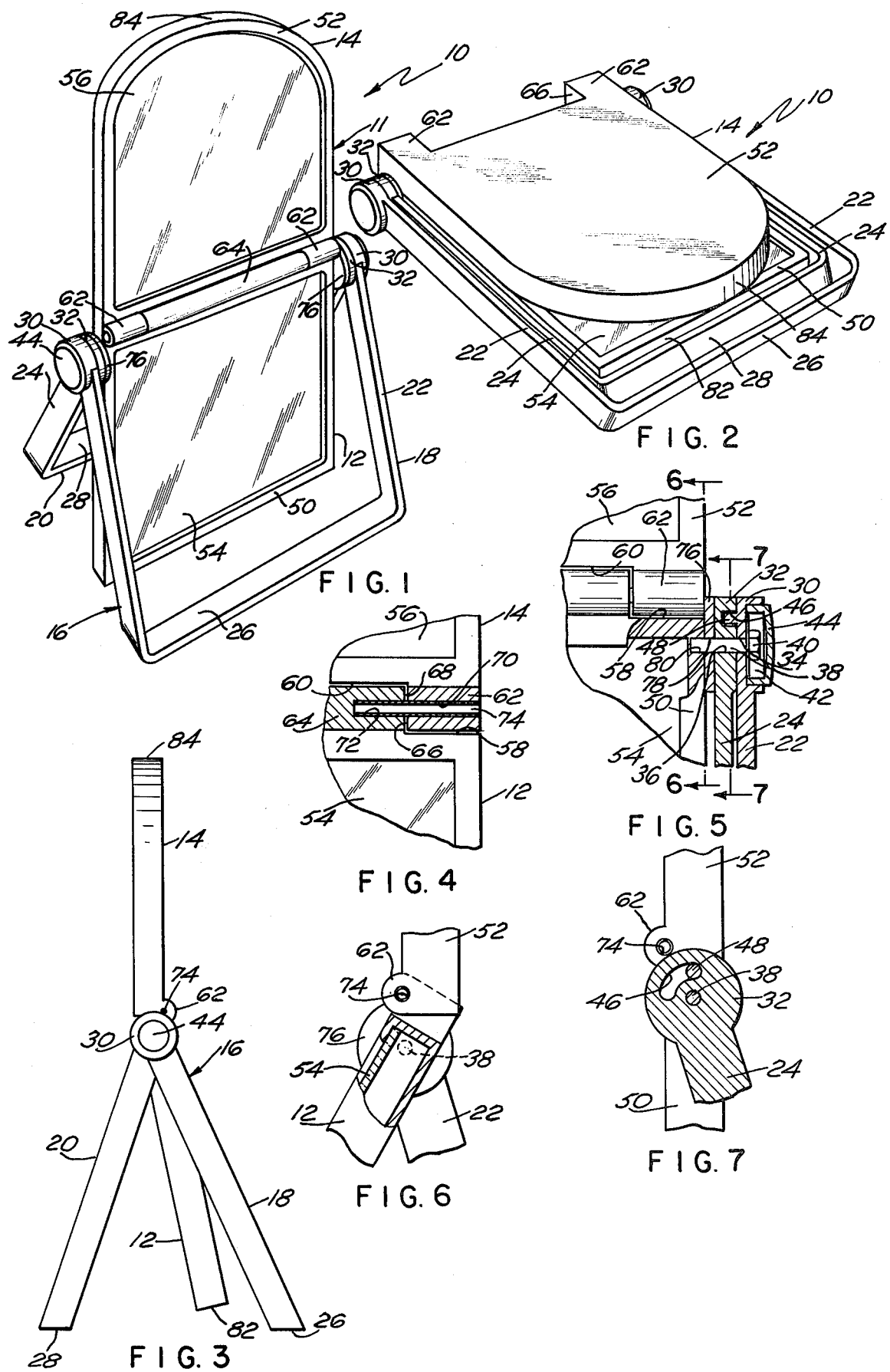

FOLDABLE MIRROR CONSTRUCTION

BACKGROUND AND SUMMARY OF THE INVENTION

This invention relates to a mirror construction particularly one in which two separate mirrors may be disposed from a supporting frame assembly in such a manner that the user thereof can view him or herself simultaneously in both such mirrors. It is common to provide a mirror such as a hand-held mirror, with magnifying and true image or planar reflecting surfaces on opposite sides thereof such that one may alternatively view oneself normally and under magnification. It is furthermore common to provide mirror constructions which are disposed upright in use and which may be folded in a generally flat or otherwise less bulky disposition for travel, storage, and the like. There remains, however, a need for a mirror construction which combines the above desired features in a straightforward, simple, yet useful and aesthetically pleasing design and which further enables simultaneous viewing of the user in both of the mirrors.

It is accordingly a primary object of the present invention to provide a mirror construction having two different reflective surfaces which may be disposed relative to one another so that a person may simultaneously view oneself therein, which construction may be easily folded to a non-use position for storage or travel.

A further object of the present invention is the provision of a mirror construction of the aforementioned type in which separate reflective surfaces thereof may be disposed in varying acute angular attitudes towards each other in use and thereafter may be disposed in face-to-face generally coplanar flat relationship for storage or travel.

A still further object of the present invention is the provision of a mirror construction of the aforementioned type in which one of the reflective surfaces is a planar mirror and the other reflective surface is a magnifying mirror and wherein either of the mirrors may be disposed either uppermost or lowermost when viewed from either side of the mirror construction.

A still further object of the present invention is the provision of a mirror construction of the aforementioned type which is of relatively simple low-cost construction and yet still affords the above-indicated use advantages.

These and other objects of the present invention are accomplished by the provision of a foldable mirror construction having first and second mirrors and a frame assembly supporting said mirrors and wherein the frame assembly includes first and second frame members each having a pair of opposed legs pivotally attached to each other at one end thereof along a first pivotal axis such that the legs may be disposed in a spaced apart acute angular upright position or alternatively nested with one another. A pair of mirrors which are in turn pivotally connected to each other, are disposed between the innermost positioned legs of such frame assembly and are mounted for free pivotal rotation with respect thereto. In this way then, the mirrors may not only be rotated as a pair simultaneously with respect to the frame assembly, but further may be rotated with respect to each other so as to dispose them in such a position that a user may simultaneously view oneself in both reflective surfaces.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a perspective view showing the construction of the foldable mirror construction of the present invention disposed in an upright use position;

FIG. 2 is a perspecitve view of the mirror construction shown in a closed travel or storage position;

FIG. 3 is a side view of the mirror construction shown in FIG. 1 of the drawing;

FIG. 4 is a partial sectional view of a portion of the mirror construction showing the manner in which the two mirrors thereof are pivotally connected to each other;

FIG. 5 is a partial side sectional view taken through a portion of FIG. 3 and shows particularly the manner in which the mirrors are mounted to the frame assembly;

FIG. 6 is a partial sectional view taken along the line 6—6 of FIG. 7; and

FIG. 7 is a partial sectional view taken along the line 7—7 of FIG. 5.

DESCRIPTION OF THE INVENTION

Turning now to the drawing and particularly FIG. 1 thereof, the mirror construction 10 of the present invention is shown in an upright use position. Such construction includes mirror assembly 11 including a first mirror 12 and a second mirror 14. The mirror assembly is in turn supported from a frame assembly 16. The frame assembly 16 includes a first frame member 18 and a second frame member 20. Both of the frame members 18 and 20 are generally of U-shaped configuration and include generally parallel spaced apart legs 22 and 24 respectively. The legs 22 of the frame 18 are interconnected at their lower end by a relatively straight foot element which presents a flat lower supporting surface 26. The legs 24 of the second frame 20 are similarly interconnected at their lower ends by a similar foot element 28.

The upper ends of the legs 22, 24 are provided with terminal portions or heads 30 and 32, respectively. The heads 30, 32 are adapted to be disposed in face-to-face disposition to each other and are in turn respectively provided with generally central bores 34 and 36. A pin 38 is transversely positioned through the aligned face-to-face bores 34 and 36 so as to pivotally interconnect the two frame members 18 and 20 with one another. The head 40 of the pin 38 may be disposed within a recess 42 provided at the outside face of the head 30 and a cover member 44 thereafter may be snap engaged or otherwise fitted within the recess 42.

The front face of the head 32 is provided with an acute arcuate slot 46, while the cooperating face of the head 30 is provided with a boss or extension 48 adapted to interfit with such slot 46. In this manner then, it may be seen that the frame members are restricted in their pivotal movement with respect to each other from a use position as shown in FIGS. 1 and 3 to a storage or travel position such as shown in FIG. 2.

Each of the mirrors 12 and 14 are respectively provided with a peripheral frame portion 50 and 52 as well as with a reflecting portion 54 and 56. Mirror 12 is generally of square or rectangular configuration whereas mirror 14 may be curved at its unconnected end, however, both of the mirrors may be constructed in any appropriate shape and may be each of the same or similar shape. The frame members as well as the frame portions of the mirrors may be formed from plastic materials such as high impact polystyrene using conventional techniques. The peripheral frame portions 50 and 52 are each respectively provided with a base edge 58 and 60. The base edges are in turn adapted to be disposed in opposed position to each other when the frame portion 50 and 52 are in fully extended relationship to each other such as shown in FIG. 1 and therefore act as a cooperative stop to prevent the mirrors from assuming a greater than 180° angle with respect to each other.

The frame portion 52 is further provided with a pair of laterally spaced, longitudinally extending ears 62. The frame portion 50 is similarly provided with a longitudinally extending ear 64, it being clear that the ear 64 is adapted to be received laterally within the ears 62 such that the respective faces 66 and 68 thereof are adapted for face-to-face disposition with regard to each other. The ears 62 are each provided with a bore 70 laterally extending therethrough. Opposite sides of the ear 64 are also provided with inwardly laterally extending bores 72. The bores 70, 72 are adpated for alignment with each other such that a pin 74 may be disposed therethrough so as to pivotally connect the mirrors 12 and 14 together and so as to provide movement from a fully extended position such as shown in FIG. 1 wherein mutual contact of the edge surface 58 and the edge surface 60 prevent further extension, to a closed position such as shown in FIG. 2 of the drawing wherein the reflective surfaces 56 and 54 are disposed in face-to-face relationship to each other. Intermediate such position limits, the mirrors 12 and 14 may be disposed in various angular relationship to each other such as shown in FIG. 3 so that the user of the mirror construction 10 may simultaneously view oneself in both of the reflective surfaces 54 and 56.

In order to mount the mirror assembly 11 comprising the interconnected mirrors 12 and 14 within the frame assembly 16, that portion of frame 50 proximal the base edge 58 thereof is provided with a flange 76 attached thereto as by conventional adhesive means or integrally molded therewith. The flange 76 is generally of a shape similar to that of the headed portions 30 and 32 and is similarly provided with a bore 78 laterally extending therethrough and adapted to be aligned with bores 34 and 36 so as to similarly receive the pin 38. The frame portion 50 may as well be provided with a bore 80, and thus the pin 38 may extend through bores 34, 36, 78 and 80. As may be seen, there is no stop or limit to the pivotal movement of the mirrors 12 and 14 with respect to the frame assembly 16 and accordingly either the mirror 12 or the mirror 14 may be disposed lowermost, dependent on the rotational attitude of the two mirrors with respect to the frame assembly 16 and dependent on the side of the frame assembly observed by the user of the mirror construction 10.

In this regard it should also be pointed out that the foot elements 26 and 28 disposed between the respective pairs of legs 22 and 24 are disposed at an angle thereto, such that when the legs are spread apart in their mirror supportive position as shown in FIGS. 1 and 3, the feet 26 and 28 will be disposed flat to a supporting surface. In such position the mirror 12 is preferably supported in a lowermost disposition relative to the other mirror 14 and the frame assembly 16. In such position, the mirror 12 may be swung between the frame members 18 and 20 such that the terminal portion 82 of the frame portion 50 will not contact the feet 26, 28. Furthermore, the relative longitudinal extent of each of the mirrors 12 and 14 is such that, should the mirrors in their fully extended position shown in FIG. 1 be rotated with respect to the frame assembly 16, that the terminal portion 84 of the mirror 14 will contact the feet 26, 28 or the surface upon which they rest. Thus, although the longitudinal extent of the mirrors is approximately equal as shown in FIG. 2, the mirror preferably disposed uppermost, namely, mirror 14 is hingedly connected to the first mirror 12 along a pivotal hinge line or axis formed by the pins 74 and longitudinally offset relative to the hinge line formed by the pin 38 and through which the mirror assembly is connected to the frame assembly. Such disposition accordingly determines the preferable disposition of the mirrors relative to each other as shown in the drawing; however, it should be clear that the mirror assembly 11 is otherwise freely rotatable, with respect to the frame assembly 16 and that accordingly the mirror assembly 11 may be disposed in any attitude with respect to the frame assembly 16 and that the individual mirrors 12 and 14 of such mirror assembly may be disposed in any attitude with respect to each other from a fully open, generally coextensive position as shown in FIG. 1, to a fully closed generally planar position as shown in FIG. 2. Furthermore, when the mirror assembly 11 is in a closed position and the frame assembly 16 is in its upright supporting position, the mirrors may be freely rotated with respect thereto without contacting the feet 26, 28 or the surface upon which they rest.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A foldable mirror construction comprising first and second mirrors and a frame assembly for supporting said mirrors, said frame assembly including first and second frame members each having a pair of opposed legs pivotally attached to each other at one end thereof along a first pivotal axis, the legs of said second frame member spaced inwardly of those of said first frame member such that said frames are adapted to nest with each other in a generally coplanar storage position and move to an angular spaced apart use position, the first mirror positioned inwardly of the opposed legs of said second member and pivotally connected to said frame assembly along said first pivotal axis and the second mirror independently pivotally connected to said first mirror, said mirrors adapted to pivotally move with respect to said frame assembly from a generally coplanar storage disposition therewith in said storage position to a use position wherein said mirrors are supported upright between said members, said mirrors further movable relative to each other from a generally flat face-to-face storage position to an angular spaced apart use position wherein a user may be simultaneously viewed in both of said mirrors, one of said mirrors being a magnifying mirror and the other being a planar mirror.

2. The mirror construction of claim 1, said first and second mirrors including peripheral frame portions, first connection means for pivotally interconnecting said frame members and said first mirror to each other along said first pivotal axis, said first connection means including a pair of pins respectively disposed through said first and second frame member legs at said one ends thereof and said first mirror frame portion on opposite sides thereof.

3. The mirror construction of claim 2, said one ends of said frame member legs having means for limiting the arcuate spaced apart pivotal travel between frame members to an acute angular disposition therebetween.

4. The mirror construction of claim 3, the other ends of said pairs of legs disposed face-to-face to each other, the face of one of said pair of legs having an acute arcuate slot adapted to receive a boss outwardly extending from the face of the other pair of legs whereby said pivotal travel between said frame members is limited.

5. The mirror construction of claim 1, said mirrors connected to each other along a second pivotal axis, said mirrors including peripheral frame portions, offset from said first pivotal axis, said peripheral frame portions of said mirrors each having a bottom edge, said bottom edges adapted to abut each other when said mirrors are disposed in a generally planar fully extended position so as to form stop means for limiting the relative pivotal movement between said mirrors from between said fully extended open position to said flat face-to-face position.

6. The mirror construction of claim 5, said mirror frame bottom edges having laterally offset ears longitudinally extending therefrom, said second pivotal axis laterally passing through said ears.

7. The mirror construction of claim 4, wherein said first frame member is larger than said second frame member and disposed to the front thereof in said upright use position.

8. The mirror construction of claim 4, said frame members each being of generally U-shaped configuration with the other ends of the legs thereof connected by a relatively straight supporting foot element.

9. The mirror construction of claim 1, said frame members each being of generally U-shaped configuration with other ends of the legs thereof connected by a relatively straight supporting foot element.

10. The mirror construction of claim 2, said mirrors collectively freely pivotally rotatable about said frame assembly whereby either of said mirrors may be alternatively positioned above or below the other when respectively viewed from either side of said frame assembly.

* * * * *